United States Patent
Artman et al.

(10) Patent No.: US 8,212,501 B2
(45) Date of Patent: Jul. 3, 2012

(54) SYSTEMS AND METHODS FOR DYNAMIC FAN SPEED CONTROL IN AN INFORMATION HANDLING SYSTEM

(75) Inventors: Paul Artman, Austin, TX (US); William K. Coxe, III, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 822 days.

(21) Appl. No.: 12/363,431

(22) Filed: Jan. 30, 2009

(65) Prior Publication Data

US 2010/0194321 A1 Aug. 5, 2010

(51) Int. Cl.
*H02P 5/00* (2006.01)

(52) U.S. Cl. ............ 318/66; 318/68; 318/454; 318/461; 318/471

(58) Field of Classification Search .................... 318/34, 318/66, 68, 454, 455, 461, 471, 472, 473
See application file for complete search history.

(56) References Cited

U.S. PATENT DOCUMENTS

| | | | |
|---|---|---|---|
| 5,249,741 A | 10/1993 | Bistline et al. | 236/49.3 |
| 6,873,883 B2 * | 3/2005 | Ziarnik | 700/300 |
| 6,891,347 B2 * | 5/2005 | Dobbs et al. | 318/471 |
| 7,489,092 B1 * | 2/2009 | Larky et al. | 318/34 |
| 2009/0167228 A1 * | 7/2009 | Chung et al. | 318/455 |
| 2010/0079094 A1 * | 4/2010 | Beltman et al. | 318/460 |

OTHER PUBLICATIONS

U.S. Appl. No. 12/245,288, Entitled Fan Speed Control, Tunks et al., 37 pages, Oct. 3, 2008.

* cited by examiner

*Primary Examiner* — Walter Benson
*Assistant Examiner* — Thai Dinh
(74) *Attorney, Agent, or Firm* — Baker Botts L.L.P.

(57) ABSTRACT

An information handling system includes a processor, memory coupled to the processor, a cooling fan, and a controller coupled to the processor and configured to control the speed of the cooling fan based on the operation of the memory. The processor is configured to determine a user-selected performance setting for the information handling system; determine a fan speed limit corresponding to the user selected performance setting; limit the speed of the cooling fan based on the determined fan speed limit; and in connection with limiting the speed of the cooling fan, control an operational parameter of the memory to reduce cooling demands generated by the memory.

17 Claims, 2 Drawing Sheets

SYSTEMS AND METHODS FOR DYNAMIC FAN SPEED CONTROL IN AN INFORMATION HANDLING SYSTEM

TECHNICAL FIELD

The present disclosure relates to information handling systems, and more particularly, systems and methods for dynamic fan speed control in an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as, but not limited to, financial transaction processing, airline reservations, enterprise data storage, or global communications. In addition, information handling systems may include a variety of hardware and software components that may be configured to process, store, and communicate information and may include one or more computer systems, data storage systems, and networking systems.

As processors, graphics cards, random access memory (RAM) and other components in information handling systems have increased in clock speed and power consumption, the amount of heat produced by such components as a side-effect of normal operation has also increased. Often, the temperatures of these components need to be kept within a reasonable range to prevent overheating, instability, malfunction and damage leading to a shortened component lifespan. Accordingly, many information handling systems include fans to cool information handling system components.

However, the cooling of components of an information handling system may impact the performance per Watt ratings, a measure of energy efficiency. Thus, the cooling fans are often driven at minimum levels to maximize the performance per Watt. However, certain components of an information handling system, such as memory components often require higher cooling power (e.g., for higher memory bandwidths). Thus, fans may be operated at higher fan speeds, which may compromise the system's performance per Watt rating.

SUMMARY

According to certain embodiments of the present disclosure, an information handling system includes a processor, memory coupled to the processor, a cooling fan, and a controller coupled to the processor and configured to control the speed of the cooling fan based on the operation of the memory. The processor is configured to determine a user-selected performance setting for the information handling system; determine a fan speed limit corresponding to the user selected performance setting; limit the speed of the cooling fan based on the determined fan speed limit; and in connection with limiting the speed of the cooling fan, control an operational parameter of the memory to reduce cooling demands generated by the memory.

According to certain embodiments of the present disclosure, a method includes determining a user selected performance setting for an information handling system; determining a fan speed limit corresponding to the user selected performance setting; controlling the fan speed of a cooling fan based on the operation of a component of the information handling system; and controlling an operational parameter of the component of the information handling system to prevent the speed of the cooling fan from exceeding the fan speed limit.

According to certain embodiments of the present disclosure, a cooling system for an information handling system includes a cooling fan, a processor, and a controller. The processor is configured to determine a user selected performance setting for the information handling system, and determine a fan speed limit for the cooling fan corresponding to the user selected performance setting. The controller is configured to control the speed of the cooling fan based at least on the operation of an information handling system component coupled to the processor. The processor is further configured to adjust an operational parameter of the information handling system component to prevent the speed of the cooling fan from exceeding the fan speed limit.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 4, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and/or a video display. The information handling system may also include one or more buses operable to transmit communications between the various hardware components.

Figure 1:
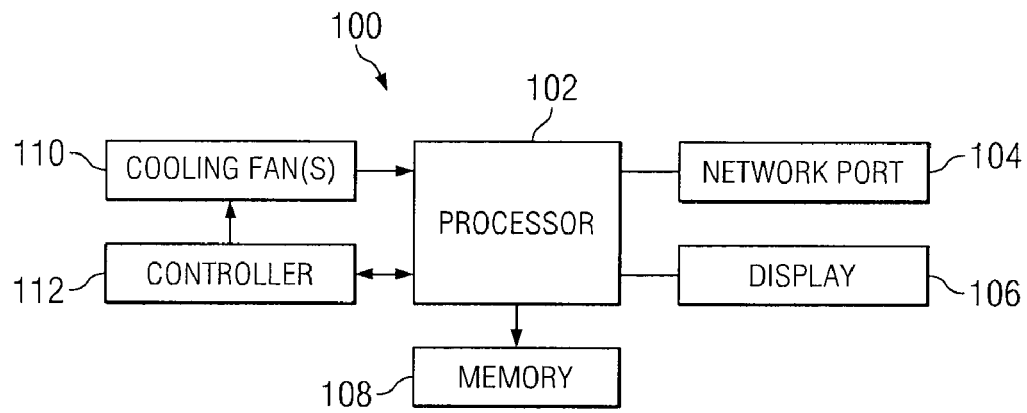
FIG. 1 illustrates a block diagram of an example information handling system including a controller configured to control the fan speed of one or more cooling fans, according to certain embodiments of the present disclosure.

FIG. 1 illustrates a block diagram of an example information handling system 100 including a fan speed control system for providing desired performance of information handling system 100, according to certain embodiments of the present disclosure. As shown in FIG. 1, information handling system 100 may include a processor 102, a network port 104, a display 106, memory 108, one or more cooling fans 110, and a controller 112.

Processor 102 may comprise any system, device, or apparatus operable to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 102 may interpret and/or execute program instructions and/or process data stored in memory 108 and/or another component of information handling system 100 and may output results, graphical user interfaces (GUIs), websites, and the like via display 106 or over network port 104.

Network port 104 may be any suitable system, apparatus, or device operable to serve as an interface between information handling system 100 and a network. Network port 104 may enable information handling system 100 to communicate over a network using any suitable transmission protocol and/or standard, including without limitation all transmission protocols and/or standards known in the art.

Display 106 may comprise any display device suitable for creating graphic images and/or alphanumeric characters recognizable to a user, and may include, for example, a liquid crystal display (LCD) or a cathode ray tube (CRT).

Memory 108 may be coupled to processor 102 and may comprise any system, device, or apparatus operable to retain program instructions or data for a period of time. Memory 108 may comprise random access memory (RAM), electrically erasable programmable read-only memory (EEPROM), a PCMCIA card, flash memory, or any suitable selection and/or array of volatile or non-volatile memory that retains data after power to information handling system 100 is turned off.

Each cooling fan 110 may be any mechanical or electromechanical fan used for cooling memory 108 and/or other components of system 100. Each cooling fan 110 may have a maximum operating speed, e.g., as determined by the fan manufacturer). In certain embodiments, cooling fan(s) 110 may draw cool air from the outside, expel warm air from components of information handling system 100, and/or move air across a heatsink to cool one or more particular components of information handling system 100.

In some embodiments, multiple cooling fans 110 may form a redundant cooling fan array. A redundant cooling fan array may permit continued cooling of information handling system 100 in the event that one or more of cooling fans 110 fails.

In some embodiments, two or more cooling fans 110 may be coupled in series such that the flow outlet of one fan 110 feeds the flow inlet of another fan 110. Often, two fans in series may be capable of delivering more air pressure as compared to equivalent fans configured in parallel.

In some embodiments, if information handling system 100 includes more than one processor 102 configured in a chassis (e.g., a modular server configuration), one or more cooling fans 110 may be coupled to each processor 102 and/or various components of information handling system 100 in the chassis. In addition or alternatively, one or more cooling fans 110 may be used to cool multiple or all processors 102 in a chassis.

Other cooling fan configurations may be used depending on, for example, the components of information handling system 100, the cooling requirement of each component, the performance per Watt rating (e.g., the energy efficiency) sought by a user for information handling system 100, and/or other design and/or performance factors.

Controller 112 may include any hardware (e.g., system, device, or apparatus), software, and/or firmware operable to control the fan speed of cooling fan(s) 110, e.g., based on a desired performance per Watt rating or other design and/or performance factors for information handling system 100. In one embodiment, controller 112 may be a baseboard management controller (BMC) coupled to processor 102.

Controller 112 may be configured to control the fan power and/or fan speed of fan(s) 110 as a function of memory temperature and/or the ambient temperature surrounding information handling system 100. For example, controller 112 may adjust the fan speed of fan(s) 110 according to a predefined minimum fan speed limit, which may depend on the external ambient temperature for system 100, e.g., as illustrated by limits 202 and 302 shown in FIGS. 2 and 3. Controller 112 may automatically adjust (e.g., increase and decrease) the fan speed above this minimum limit based on the current operation of memory 108. For example, controller 112 may automatically increase and decrease the fan speed in response to increases and decreases in the temperature of memory 108.

In addition, controller 112 is further configured to control the fan power and/or fan speed of cooling fan(s) 110 based on a performance setting for information handling system 100. Such performance setting may be selected from multiple available performance settings, e.g., automatically (e.g., by processor 102) and/or manually based on user input. Available performance settings may include a default performance setting and a "performance per watt" (herein, PPW) performance setting. The PPW performance setting may be configured for providing an improved or substantially optimized performance per watt rating (e.g., energy efficiency rating) for system 100, as compared with a default performance setting or other available performance setting(s).

The PPW performance setting may define a maximum fan speed limit (herein, the "PPW fan speed limit") for cooling fan(s) 110 that is lower than the maximum possible speed or other system-enforced speed limit for fan(s) 110. The PPW fan speed limit is generally configured to improve or substantially optimize the performance per watt rating for system 100 (as compared with a default performance setting) by limiting the fan(s) 110 from operating at speeds that would decrease the performance per watt rating for system 100. The PPW performance setting may specify that when the PPW fan speed limit is reached, the bandwidth of memory 108 (or other device) is throttled (e.g., held steady or reduced) rather than continuing to increase the fan speed.

Figure 2:
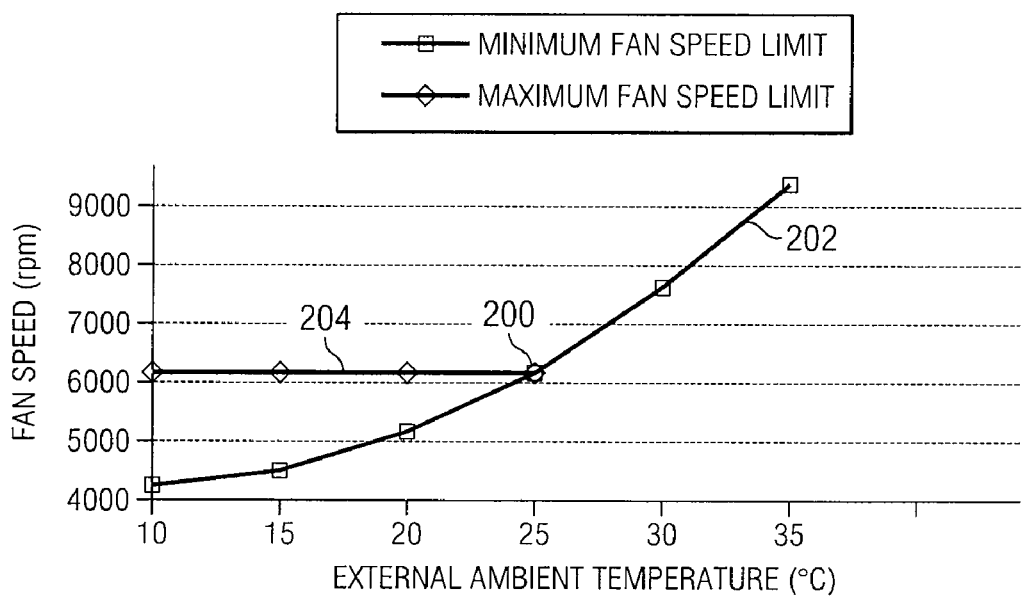
FIG. 2 illustrates an example graph showing a fixed maximum fan speed limit for one or more cooling fans that may yield a desired performance per Watt rating in an information handling system, according to certain embodiments of the present disclosure.
Figure 3:
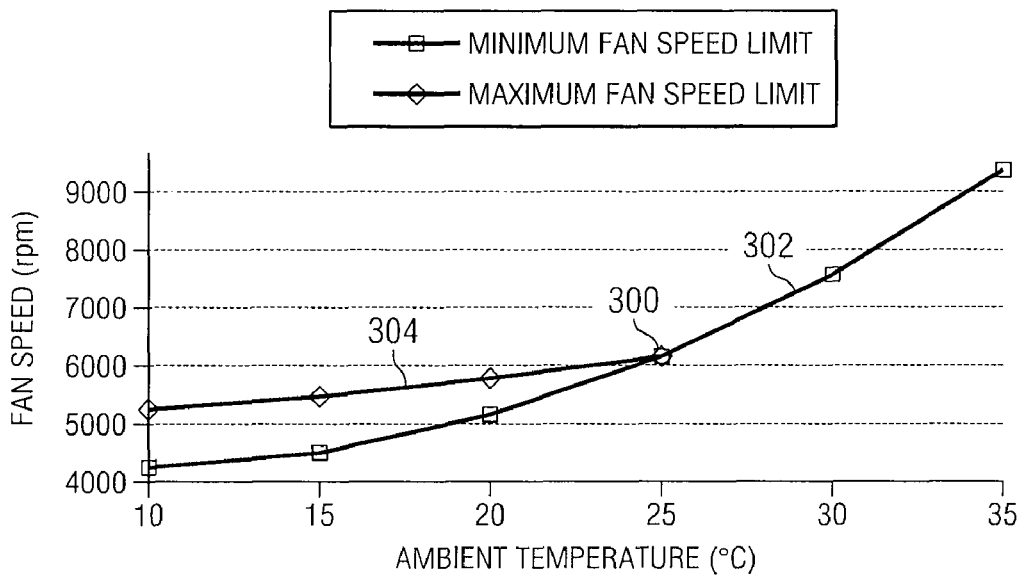
FIG. 3 illustrates an example graph showing an ambient temperature-dependent maximum fan speed limit for one or more cooling fans that may yield a desired performance per Watt rating in an information handling system, according to certain embodiments of the present disclosure.

The PPW fan speed limit may be a fixed fan speed limit (e.g., a fixed value independent of ambient temperature) or a variable fan speed (e.g., dependent on the ambient temperature around system 100). FIGS. 2 and 3 discussed below illustrate examples of these two types of PPW fan speed limits. The PPW fan speed limit may be determined in any suitable manner, e.g., predetermined by a computer system or manually, determined dynamically and automatically by processor 102, or determined dynamically and manually by a user. In some embodiments, a user may enter a desired performance per watt value, and processor 102 may determine a PPW fan speed limit that may determine a PPW fan speed limit (fixed or ambient-temperature-dependent) for achieving the requested performance per watt value.

FIG. 2 is a graph showing an example fixed PPW fan speed limit for cooling fan(s) 110 that may yield a desired performance per Watt rating for system 100, according to certain embodiments of the present disclosure. In this example, processor 102 may set a PPW fan speed limit at approximately 6100 RPM for external ambient temperatures below 25° C. For ambient temperatures below about 25° C., controller 112 may increase the fan speed between a minimum fan speed limit 202 (e.g., the minimum system cooling fan speed requirements for memory 108) and the PPW fan speed limit 204. For example, if access to memory 108 is increased (e.g., increased memory temperature), resulting in a demand for increased cooling of memory 108, controller 112 may increase the fan speed up to the PPW fan speed limit 204 of approximately 6100 RPM. When cooling demands reach the PPW limit 204 of 6100 RPM, controller 112 may limit the fan speed to 6100 and send a signal to processor 102 to throttle (e.g., hold steady or decrease) the bandwidth or other operational parameter of memory 108. The rationale is that increasing the fan speed above 6100 in this example lowers the resulting performance per watt of system 100.

In this embodiment, the PPW fan speed limit 204 is applied for ambient temperatures below the point where the PPW fan speed limit 204 meets the minimum fan speed limit 202 of fan(s) 110, indicated as point 200. For ambient temperatures above point 200, fan(s) 110 may be sped up to their maximum speed or other system-defined limit, according to the current cooling demands.

FIG. 3 is a graph showing an example ambient-temperature-dependent PPW fan speed limit for cooling fan(s) 110 that may yield a desired performance per Watt rating for system 100, according to certain embodiments of the present disclosure. In this embodiment, a PPW fan speed limit 304 increases linearly according to the ambient temperature around system 100. For ambient temperatures below about 25° C., controller 112 may increase the fan speed between a minimum fan speed limit 302 (e.g., the minimum system cooling fan speed requirements for memory 108) and the PPW fan speed limit 304. For example, if access to memory 108 is increased (e.g., increased memory temperature), resulting in a demand for increased cooling of memory 108, controller 112 may increase the fan speed up to the PPW fan speed limit 304, which depends on the current ambient temperature. When cooling demands reach the PPW limit 304, controller 112 may limit the fan speed and send a signal to processor 102 to throttle (e.g., hold steady or decrease) the bandwidth or other operational parameter of memory 108. The rationale is that increasing the fan speed above PPW limit 304 in this example lowers the resulting performance per watt of system 100.

In this embodiment, the PPW fan speed limit 304 is applied for ambient temperatures below the point where the PPW fan speed limit 304 meets the minimum fan speed limit 302 of fan(s) 110, indicated as point 300. For ambient temperatures above point 300, fan(s) 110 may be sped up to their maximum speed or other system-defined limit, according to the current cooling demands.

Figure 4:
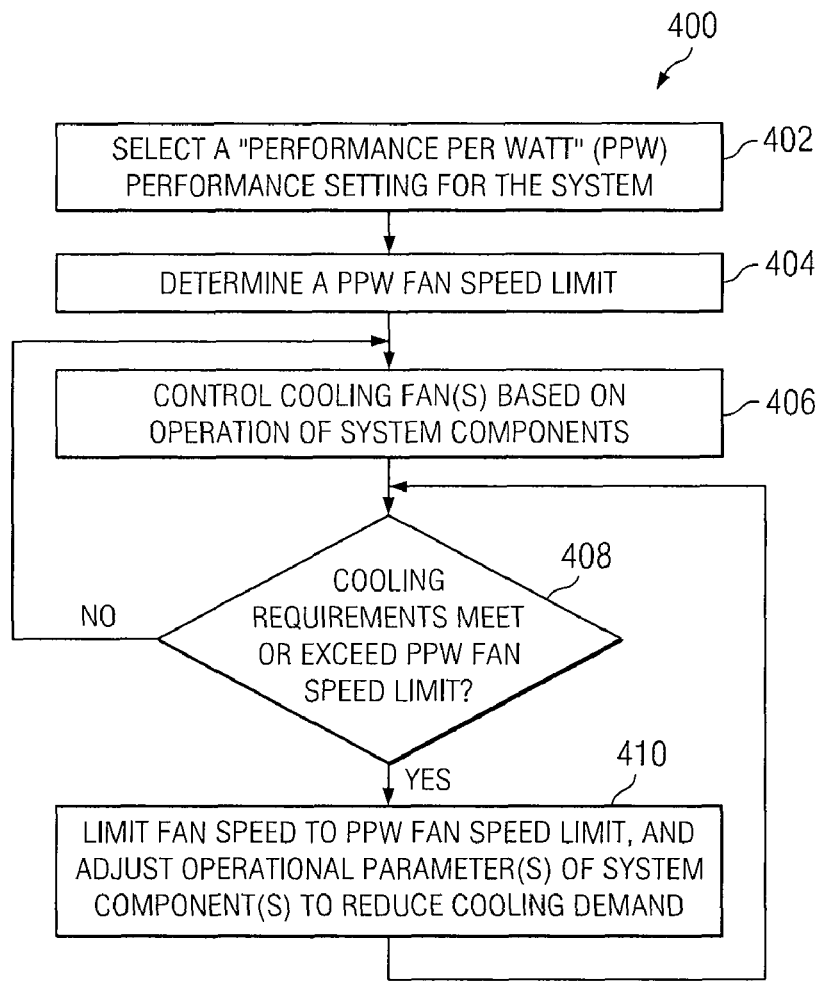
FIG. 4 illustrates a flow chart of an example method for controlling fan speed to provide desired performance in an information handling system, according to certain embodiments of the present disclosure.

FIG. 4 illustrates a flow chart of an example method 400 for controlling fan speeds to provide a desired performance in an information handling system 100, according to certain embodiments of the present disclosure. At step 402, processor 102 may receive a user-selected performance setting for information handling system 100. For example, system 100 may present the user with multiple performance settings to select from, including a default performance setting, a performance per Watt (PPW) performance setting, and/or other performance setting. The user may select one of these settings, e.g., via an input device. In this example method, it is assumed that the user selects a PPW performance setting. In some embodiments, the user may input a desired performance per Watt rating for system 100.

In some embodiments, step 402 may be optional. Processor 102 and/or controller 112 may automatically select a PPW performance setting for information handling system 100, or a PPW performance setting may be an out-of-box manufacturer setting.

At step 404, processor 102 may determine a PPW fan speed limit for the user-selected PPW performance setting. For example, if processor 102 determines, or a user inputs, a desired performance per Watt rating, processor 102 may determine a fan speed limit to achieved the desired setting. This PPW fan speed limit may be fixed or variable (e.g., ambient-temperature-dependent), e.g., as shown in FIGS. 2 and 3. The PPW fan speed limit is typically lower than the maximum manufactured operating speed of cooling fan(s) 110.

At step 406, controller 112 may control cooling fan(s) 110 at a fan speed based on the operations of information handling system 100 (e.g., based at least on the operation of memory 108). For example, controller 112 may control the fan speed at or above a minimum fan speed limit (e.g., minimum fan speed limit 202 of FIG. 2 or minimum fan speed limit 302 of FIG. 3), based on the current cooling demands of system components (e.g., memory 108).

At step 408, processor 102 may determine whether the fan speed required to cool system components (e.g., memory 108) meets or exceeds the PPW fan speed limit determined at step 404. For instance, the operations of system components may require higher fan speeds due to increased processing, bandwidth, etc. As a particular example, memory 108 may be accessed by processor 102 and the bandwidth may be increased, thus leading to an increase in heat generated by memory 108.

If the fan speed needed to cool system components does not meet or exceed the PPW fan speed limit, the method may return to step 406 and continue to control the cooling fans based on the operation of memory 108. However, if the required fan speed needed to cool system components meets or exceeds the PPW fan speed limit, method 400 may proceed to step 410.

At step 410, processor 102 may limit the fan speed based on the PPW limit and adjust one or more operational parameters of memory 108 (and/or other system components) to reduce the current cooling demand. For example, in some embodiments, processor 102 may adjust (e.g., decrease) the memory bandwidth of memory 108 to reduce the heat generated by memory 108, which reduces the fan speed required to cool memory 108. Method 400 may then return to step 408 to compare the lowered cooling demands to the PPW fan speed limit.

Method 410 may continually or periodically monitor and regulate the fan speed of cooling fan(s) 110 based on the PPW fan speed limit in this manner. In some embodiments, e.g., as discussed above regarding FIGS. 2 and 3, the PPW fan speed limit may only apply for a particular ambient temperature range (e.g., below a point where the PPW fan speed limit is trumped by a minimum fan speed limit).

Although the present disclosure has been described in detail, it should be understood that various changes, substitutions, and alterations can be made hereto without departing from the spirit and the scope of the invention as defined by the appended claims.

What is claimed is:

1. An information handling system, comprising:
   a processor;
   memory communicatively coupled to the processor;
   a cooling fan; and
   a controller coupled to the processor and configured to control a speed of the cooling fan based on an operation of the memory;
   wherein the controller and processor cooperate to:
      determine a user selected performance setting for the information handling system;
      determine a fan speed limit corresponding to the user selected performance setting;
      limit the speed of the cooling fan based on the determined fan speed limit; and
      in connection with limiting the speed of the cooling fan based on the fan speed limit, control an operational parameter of the memory to reduce cooling demands generated by the memory.

2. The information handling system of claim 1, wherein the user selected performance setting comprises a performance per Watt setting.

3. The information handling system of claim 1, wherein determining a fan speed limit comprises determining a fixed maximum fan speed limit.

4. The information handling system of claim 1, wherein determining a fan speed limit comprises determining a variable fan speed limit dependent on an ambient temperature for the information handling system.

5. The information handling system of claim 1, wherein control an operational parameter of the memory to reduce cooling demands generated by the memory comprises throttling a bandwidth of the memory.

6. The information handling system of claim 1, wherein the controller is configured to adjust the fan speed of the cooling fan up to the fan speed limit based at least on the operation of the memory.

7. The information handling system of claim 1, wherein:
   the cooling fan has a maximum operation speed; and
   the fan speed limit is less than the maximum operation speed of the cooling fan.

8. A cooling system, the cooling system comprising:
   a cooling fan;
   a processor configured to:
      determine a user selected performance setting for the information handling system; and
      determine a fan speed limit for the cooling fan corresponding to the user selected performance setting; and
   a controller coupled to the processor, wherein the controller is configured to control the speed of the cooling fan based at least on an operation of a memory device coupled to the processor;
   wherein the processor is further configured to adjust a bandwidth of the memory device to prevent the speed of the cooling fan from exceeding the fan speed limit.

9. The cooling system of claim 8, wherein the user selected performance setting comprises a performance per Watt rating setting.

10. The cooling system of claim 8, wherein to determine a fan speed limit comprises determining a fixed fan speed limit.

11. The cooling system of claim 8, wherein to determine a fan speed limit comprises determining a variable fan speed limit dependent on an ambient temperature for the information handling system.

12. The cooling system of claim 8, wherein the controller is further configured to adjust the fan speed of the cooling fan up to the fan speed limit based at least on the operation of the memory device.

13. A method, comprising:
   determining a user selected performance setting for an information handling system;
   determining a fan speed limit corresponding to the user selected performance setting;
   controlling the fan speed of a cooling fan based on an operation of a memory of the information handling system; and
   adjusting a memory bandwidth of the memory to prevent the speed of the cooling fan from exceeding the fan speed limit.

14. The method of claim 13, wherein the user selected performance setting comprises a performance per Watt rating setting.

15. The method of claim 13, wherein determining a fan speed limit comprises determining a fixed maximum fan speed.

16. The method of claim 13, wherein determining a fan speed limit comprises determining a maximum fan speed limit dependent on an ambient temperature of the information handling system.

17. The method of claim 13, further comprising adjusting the fan speed of the cooling fan up to the fan speed limit based on the operation of the memory.

* * * * *